Nov. 29, 1949  W. G. ABRAHAM  2,489,248
NAVIGATION SYSTEM
Filed Sept. 1, 1943
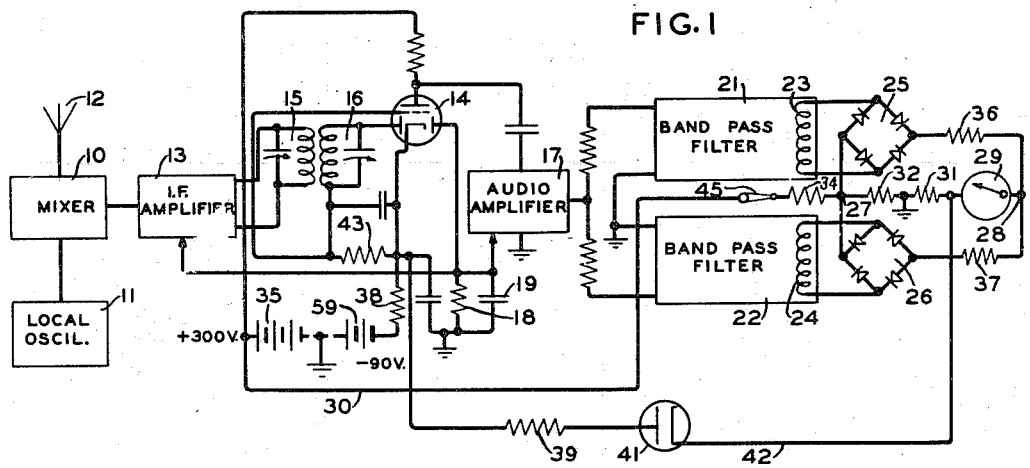
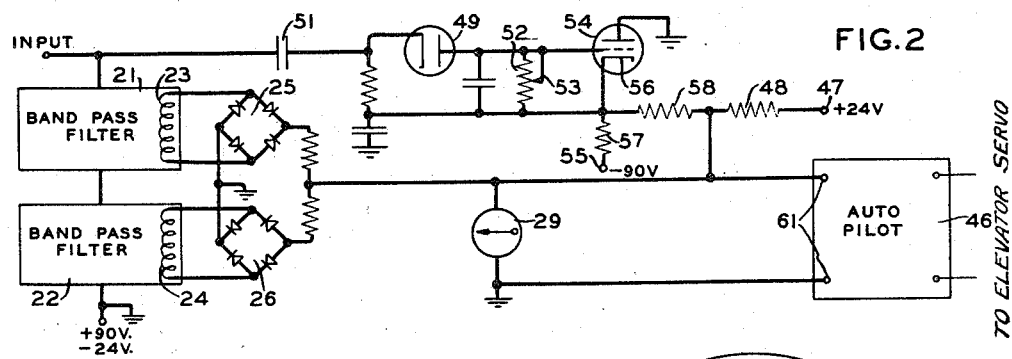
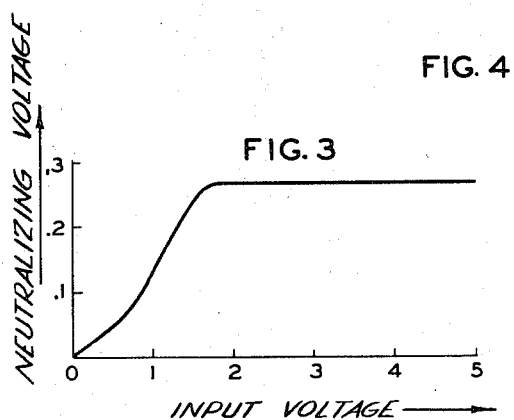
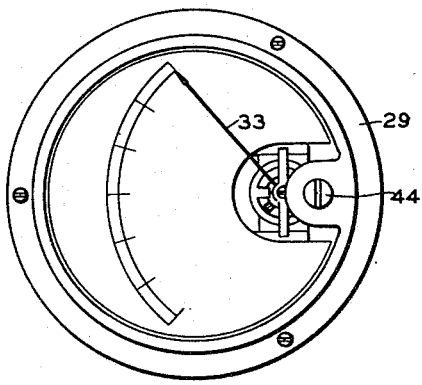
INVENTOR
W. G. ABRAHAM
BY
Herbert H. Thompson
his ATTORNEY.

Patented Nov. 29, 1949

2,489,248

UNITED STATES PATENT OFFICE 2,489,248

NAVIGATION SYSTEM

Wayne G. Abraham, East Hempstead, N. Y., assignor to The Sperry Corporation, a corporation of Delaware Application September 1, 1943, Serial No. 500,761

26 Claims. (Cl. 343—108)

1

This invention relates to navigation systems, and more particularly to safety provisions for use on dirigible craft.

This invention is especially concerned with causing a craft to deviate from an established radio beacon course, whenever the craft fails to receive the beacon signals. Although the present invention is adapted for use on various types of craft following various types of radio beams, it is herein specifically described as applied to air craft following equi-signal glide paths when making instrument landings, although it will be understood that the principles have more general use.

A pilot is advised that his craft is making a proper descent along an equi-signal glide path when the landing instrument or glide path meter, being unenergized, provides a neutral or "on course" indication. It will be apparent, however, that such an instrument may mislead the pilot as to the location of his plane, should a failure in the reception of the glide path signals, followed by a natural deviation of the craft, leave the meter in the same neutral position. Thus, assuming that the reception of glide path signals were interrupted for any reason during a normal landing operation, the plane might deviate dangerously downward from the glide path while the landing instrument continued to denote a normal approach condition. The present improved system provides an appropriate signal to the pilot in the event of transmitter or receiver trouble.

The difficulty is not ordinarily encountered with constant intensity glide path systems wherein the craft follows a curved path along which the field strength of the radiated energy remains constant. In such systems, the meter is energized from a fly-up indication in the "at rest" position according to the field intensity of the radiated pattern and is adjusted to provide a neutral or "on course" indication whenever the craft is disposed along the desired constant intensity line, the meter being biased from the fly-up position as a function of the glide path signal strength. If for any reason, reception of the glide path signals should fail, the meter pointer is restored to the "at rest" position to provide a suitable indication to the pilot to fly his craft in an upward direction out of any possible immediate danger from collision with obstacles near the ground, until the trouble has been identified and suitable protective measures have been adopted.

2

In other types of instrument landing systems, such as those including the equi-signal system, wherein the glide path is defined as the axis of a plurality of intersecting lobes of radiant energy, the landing instrument fails to provide any sort of warning if the glide path signals should no longer be received while the craft is following the glide path. A proposal merely to shift the landing instrument pointer so as to provide a fly-up indication for equi-signal systems when the instrument is unenergized, is unsuitable because it requires the craft to fly above the course to obtain a displacement signal capable of neutralizing the pointer shift (to restore the pointer to an on-course position), at which time the on-course indication manifestly is in error.

It is the purpose of the present invention to provide a suitable warning for the pilot in the event of failure of either the glide path transmitter or the receiver, which warning, not only apprises the pilot of the abnormal condition, but also provides the pilot with an indication, such as a fly-up signal, that induces a corrective movement of the craft so as to remove it from immediate danger of collision.

The principle objects of the present invention are: to provide an improved system of position indication for craft following a radio beam; to provide a fly-up signal device for equi-signal instrument landing systems in the event of failure of reception of the instrument landing signals; to provide in such a system a position indicator initially biased to provide a fly-up signal, and to provide neutralizing means for the bias conditioned upon reception of glide path signals above a certain predetermined signal level; to provide a system for electrically biasing an instrument landing meter and for applying a counter-bias signal in response to received instrument landing signals; to provide a system for biasing an instrument landing meter from a reliable energy source and for neutralizing the bias by applying a second signal derived from received glide path data; and to provide a fly-up indication and fly-up signals for use with an automatic aircraft pilot in the event of failure of the transmitting or receiving system. These and other objects will become more apparent from the following description and from the accompanying drawing, disclosing typical embodiments of the present invention.

In the drawing,

Fig. 1 is a schematic arrangement of a receiver embodying one form of fly-up provision.

Fig. 2 is a schematic arrangement of a portion of the receiver shown in Fig. 1 illustrating a second method for obtaining the fly-up signal and also its use in combination with an automatic pilot.

Fig. 3 is a graph illustrating the relation of the input signal strength to the signal energizing the fly-up meter, and Fig. 4 is an elevational view of a typical meter suitable to provide the fly-up indication.

Generally speaking, the invention comprehends initially setting or biasing the landing instrument so that the instrument provides a fly-up indication in the event of failure of the displacement-indicating signals normally operating the instrument. This may be done in the case of a meter having a movable pointer by biasing the pointer mechanically, that is, by displacing the pointer relative to the meter movement until the pointer has full scale or part scale up-indicating deflection when the meter is unenergized. The pointer likewise may be displaced electrically by some reliable energy source, and the bias may be removed when instrument landing signals are received. Various other possible methods of providing a fly-up signal will become apparent from the detailed description that follows:

Fig. 1 diagrammatically illustrates a typical instrument landing receiver of the general type shown in W. T. Cooke et al. Patent No. 2,307,023, dated January 5, 1943. The present receiver comprises a mixer 10 and local oscillator 11 adapted to convert the radio signals preferably of ultra-high frequency derived from antenna 12, to some suitable intermediate frequency for amplification in amplifier 13. The signals are conducted to a detector 14 of conventional design through tuned coupling circuits 15 and 16. The detector may comprise a duo-diode-triode, as shown, with diode detection and triode amplification occurring in two sections of the tube, while the remaining diode is utilized to provide automatic volume control for the intermedate frequency amplifier 13, and if necessary, for the audio amplifier 17. The automatic volume control voltage is developed across an R—C network comprising resistor 18 and capacitor 19.

The audio amplifier feeds into a pair of band pass filters 21 and 22 which filter out all but the different modulation frequencies, e. g. 600 to 900 cycles per second, distinguishing the respective overlapping beams of radio frequency energy forming the radio beacon. Each of the band pass filters includes an inductively coupled output coil 23 or 24, respectively, connected to the input terminals of bridge rectifiers 25 and 26 having a common output terminal 27. The opposite output terminal of each rectifier connects with one post 28 of the landing instrument 29, the circuit being completed to the terminal 27 through resistors 31 and 32.

The instrument landing system thus far described is of conventional design and operates in the following manner. Since the receiver is located on a craft normally disposed in the region of the overlapping directive beams, some energy from both beams is detected, amplified and conducted to the band pass filters 21 and 22 where the respective audio modulation components are segregated and rectified so as to energize the instrument 29 in opposition. When the plane is directly on the beam the received audio components are of equal intensity, and the instrument 29 provides a neutral or "on course" designation. It is apparent that should the transmitter or receiver fail, the instrument 29 would continue to provide a normal indication, even though the craft may have deviated upwardly or downwardly from the glide path. This is a disadvantage in that it detracts from the reliability of the system and precludes the pilot from vesting full confidence in the glide path reading.

The present invention contemplates overcoming this disadvantage by assuring the pilot of a fly-up signal whenever the reception of glide-path signals fails. To insure most positively the formation of a fly-up signal, the instrument 29 preferably is initially biased or set to provide such an indication when the instrument is unenergized. If the instrument 29 comprises a conventional electric meter having a pointer 33 pivotable about a bearing or movement in response to a signal across the meter terminals, a fly-up indication may be provided when the meter movement is in the neutral position by mechanically displacing or biasing the pointer to the full scale deflection position as indicated in Fig. 4.

Provision is then made to restore the pointer by neutralizing the mechanical displacement or bias in response to a signal derived from the instrument landing beams. One circuit for obtaining this result is disclosed in Fig. 1 and utilizes a voltage developed across resistor 32 by the current from detector plate supply 35 to oppose the meter bias by urging the pointer downwardly. Particular values of resistance and voltage will be ascribed to assist in an understanding of the operation, although the apparatus is in no sense thus limited. The voltage developed across resistor 32 depends upon the voltage of the supply 35 and upon the value of resistor 34 in series with the resistor 32 to complete a circuit to the grounded negative side of the supply 35. Assuming a plate supply of 300 volts and resistance values of 150,000 ohms and 250 ohms, respectively, for resistors 34 and 32, a voltage of approximately ½ volt will develop between the point 27 and ground which is effective through rectifier circuit 25 and series resistor 36 to apply a neutralizing bias impulse to the instrument 29 which, in the case of an electric meter, is sufficient to restore the pointer 33 to a neutral or "on course" positon, presuming that the craft is located on the equi-signal line, or glide path.

To provide a fly-up signal in the event of trouble, additional means are provided to overcome the bias-neutralizing impulse. As shown in Fig. 1, this may be accomplished with apparatus that delivers a counter-balancing voltage equal to that developed across resistor 32 whenever the apparatus does not receive instrumental landing signals. A resistor 38 of the order of 200,000 ohms may be connected between the cathode of detector 14 and a bias supply 59 of 90 volts relative to ground. The cathode then may be coupled through a resistor 39 to a diode 41, the cathode of which connects through wire 42 with the end of resistor 31 opposite to ground. The diode develops a counteracting voltage across resistor 31 whenever the system fails to receive beam signals properly.

In operation, when the receiver is not detecting energy from the antenna 12 no voltage develops across the audio load resistor 43, and the control grid of the detector 14 is in a quiescent state allowing a quiescent plate current of perhaps ½ milliampere to flow through resistor 38, thereby developing a counter-bias across resistor 38 of 100 volts, and causing a signal of approximately 10 volts positive polarity to appear on the anode of diode 41. Assuming a direct current flow of ½ milliampere in wire 42, and assuming resistor 31 to comprise 1000 ohms, a potential of ½ volt develops between the meter 29 and ground exactly neutralizing the voltage across resistor 32 and providing the fly-up indication of the meter 29 created by the mechanical displacement of the pointer.

If now signals of predetermined intensity appear on antenna 12, they are converted to amplified intermediate frequency signals to be applied to detector 14. The direct current flowing through resistor 43, biases the control grid of detector 14 in such a way as to diminish anode to cathode current, thereby lessening the voltage drop across resistor 38. Under these circumstances the potential on the detector cathode and likewise the anode of diode 41 falls from a positive value to zero or even to a negative value. In either event diode 41 ceases to be conductive and the counter-balancing voltage disappears across resistor 31, in which event the voltage across resistor 32 neutralizes the bias on the instrument 29 to denote satisfactory operation of the system, assuming the craft to be on course.

It will be apparent that the rectified audio signals from the band pass filters 21 and 22 are operable on the pointer 33 independently of the fly-up and neutralizing impulses. Hence, although the voltage across resistor 32 neutralizes a mechanical bias on the instrument 29, the pointer 33 may not be in a neutral position because of an unbalance in the output voltage of the respective band pass filters, indicating that the craft is off course. The bias-neutralizing signal, however, is obtainable irrespective of whether the instrument of a craft denotes "on course" or "off course," because the anode voltage of diode 41 is responsive to all detected signals with both modulation components present, and the signal including both components does not vary appreciably over a range of positions on either side of the course.

The signal neutralizing the mechanical bias of the pointer 33 reaches a stable level whenever the input signal attains a predetermined strength, usually slightly above the noise level. The voltage across the instrument 29 is rendered stable by eliminating the counteracting voltage produced by the diode 41 when little or no signal is present. The manner in which the bias-neutralizing voltage rises to a uniform value is shown graphically in Fig. 3 wherein the neutralizing voltage appearing across the instrument is shown to build up from zero at no input signal to approximately 0.3 volt at a signal strength slightly above the noise level. The curve disclosed in Fig. 3 represents the results of experiments performed on a receiver having an instrument 29 whose pointer was restored from the initial fly-up position to the neutral position in response to a voltage equal to the maximum shown in the curve.

Although mechanical displacement of the pointer 33 is considered to be the most reliable type of fly-up signal, there are certain instances when such an arrangement is undesirable. For example, when the craft is provided with an automatic pilot, the signal registered on the pilot will not be zero when the pointer 33 is restored to a neutral position because of the voltage required across the instrument terminals to neutralize the mechanical bias. Similarly, if the instrument 29 provides a fly-up indication with mechanical displacement of the pointer, no current is flowing through the meter, and an automatic pilot connected across the meter would not therefore receive fly-up signals as indicated on the instrument.

Both Figs. 1 and 2 disclose alternative arrangements by which the meter current may be zero when the meter is in the neutral position. In the arrangement disclosed in Fig. 1 the result may be obtained by adjusting the pointer 33 from a part-scale fly-up position until it occupies a neutral position when the meter is unenergized. With many types of conventional meters such adjustment of the pointer may be made by an adjustment screw 44, as shown in Fig. 4. With the instrument 29 thus neutralized, the system operates in a satisfactory manner if a switch 45 is inserted in the wire 30 and is opened so as to discontinue the flow of current from the supply 35 to resistor 32.

Accordingly, whenever the receiver fails to receive course signals of predetermined strength, the diode 41 conducts a known steady current, producing a predetermined voltage across resistor 31 that deflects the pointer 33 so as to provide a fly-up indication.

A modified arrangement of receiver employing neutral pointer positioning and electrical shifting of the pointer to the fly-up position is shown in Fig. 2. Band pass filters 21 and 22 of the same general design as those shown in Fig. 1 have their input circuits disposed preferably in series across the output of an audio amplifier 17 energized in the manner shown in Fig. 1. The output coils 23 and 24 connect with bridge rectifiers 25 and 26 in the manner shown, feeding an instrument 29 in mutual opposition so as to produce a differential signal across the instrument as a function of the displacement of the craft relative to the equi-signal line.

An auto pilot 46, of any conventional design responsive to electrical impulses, may have the input terminals 61 of its pitch-controlling portion connected across the instrument 29 to correct the craft's attitude in accordance with displacement signals appearing across the instrument. If the receiver should fail to receive signals from the radio beam, provision is made to produce a fly-up indication on the instrument 29, and accordingly a corresponding signal in the auto pilot 46, to cause the craft to fly up out of any possible immediate danger. In order to most positively assure the formation of the fly-up signal, use is made of the power lines serving as the main source of electrical energy in the craft. In the case of an airplane, this usually comprises a 24 volt power line fed by storage batteries maintained by an engine-driven generator.

The positive terminal 47 of the power supply line connects through a suitable resistor 48 to the ungrounded terminal of the instrument 29. Presuming the instrument 29 to comprise an electric meter requiring 100 microamperes for full scale deflection, and assuming a 24 volt source of supply, the resistor 48 should be of 240,000 ohms. The foregoing arrangement is capable of producing a full scale fly-up signal in the instrument 29.

Provision is made to counteract the fly-up signal whenever glide path signals are properly received. A suitable arrangement for the purpose may comprise a diode 49, the cathode of which connects with the audio amplifier output through a coupling condenser 51. The rectified audio voltage appears across output resistor 52, which may take the form of a potentiometer having a slider 53 connected to the grid of a triode 54 to provide proper control thereof as an electronic switch. When audio components of a sufficient magnitude are present, a large negative voltage appears on the grid of triode 54, biasing the tube to cut-off. The negative terminal 55 of a plate supply is connected with the cathode 56 through a resistor 57. A second resistor 58 connects the cathode 56 with the ungrounded meter terminal.

Assuming terminal 55 to be at −90 volts relative to ground, and assuming resistors 57 and 58 to be of 280,000 ohms and 620,000 ohms, respectively, a current of 100 microamperes will flow through the meter 29 from ground to the negative terminal 55 in a direction opposite to the current from terminal 47, thereby exactly neutralizing the fly-up signal and neutralizing any voltage across the instrument 29.

If now for any reason the audio voltage across the input to the band pass filters should disappear or reduce to a value below a predetermined level, the bias is removed from the triode 54 causing current to flow from the grounded anode through the resistor 57 so as to increase the voltage drop across resistor 57. The increased voltage drop reduces the flow of counteracting current from ground through the meter 29 and through resistors 58 and 57, and the resulting unbalance produces a fly-up signal in the instrument 29.

The band pass filters connected across the output of the audio amplifier develop a voltage across the diode 49 as a function of the audio frequency; hence the band pass filters have a high input impedance to frequencies within the respective pass bands, so that noise and other frequencies are attenuated to a greater degree, and hence the circuit operates selectively on either or both signal frequencies or is less sensitive to other frequencies and noise. The audio voltage at which the circuit operates may be adjusted by varying the position of slider 53, and the amount of fly-up signal produced may be controlled by adjusting the proportion of resistor 57 to resistor 58, while maintaining a constant value for their sum.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. An equi-signal glide path positional indicator for aircraft, comprising indicating means normally biased to provide a fly-up signal, and compensating means responsive to variable magnitude glide-path signals exceeding in field strength a predetermined minimum for producing a constant magnitude compensating signal equal and opposite to said fly-up signal.

2. An equi-signal glide path position indicator for aircraft, comprising a meter having a pointer normally biased to provide a fly-up signal, and compensating means responsive to variable magnitude glide-path signals of at least a predetermined field strength for neutralizing said pointer bias.

3. A position indicator for a craft following a course along a radio beam comprising indicating means normally biased to denote an off-course position of said craft, and fixed magnitude counter-bias means responsive to a beam intensity above a predetermined minimum intensity for so restoring said indicating means as to denote a true position of said craft.

4. A position indicator for aircraft following a glide path defined by directive radio energy, comprising path-indicating means normally biased to denote a below-course position of said aircraft, means responsive to signals derived from the presence of said energy for exactly counter-biasing said indicating means, and means responsive to vertical deviation of said aircraft from said glide path for controlling the indications produced by indicating means.

5. A position indicator for a craft following a course along a beam defined by directively-radiated radio signals, said indicator comprising course-indicating means normally biased to denote an off-course position of said craft, means sensitive to the existence of such detected radio signals for counter-biasing said indicating means, and means responsive to deviations of said craft from said beam for controlling corresponding indications produced by said indicating means.

6. A position indicator for aircraft homing along a radio beacon course comprising a meter having a pointer initially biased from the neutral position so as to provide a fly-up signal, counter-biasing means responsive to the presence of said beam for neutralizing said pointer bias, and means for moving said pointer from said neutral position in response to displacement of said aircraft to regions above and below said course.

7. A position indicator for aircraft flying along a radio beam glide path, comprising a meter having a pointer movable in either direction from a neutral position to designate displacement of said aircraft above and below said path, said pointer being initially mechanically displaced from said neutral position to denote a below-course position of said aircraft, means reponsive to a signal of fixed magnitude derived from said beam for neutralizing said mechanical displacement, and means for applying to said meter signals varying with the displacement of said aircraft above and below said path.

8. A position indicator for aircraft flying along a radio beam glide path, comprising a meter having a pointer movable in either direction from a neutral position to designate displacement of said aircraft above and below said path, electrical means for applying a constant initial bias voltage to said meter to displace said pointer from said neutral positional so as to provide a fly-up signal, means responsive to a signal of fixed magnitude derived from said beam for neutralizing said bias, and means for applying to said meter signals varying with the displacement of said aircraft above and below said path.

9. In an aircraft instrument-landing system, apparatus for producing a fly-up signal in the event of failure of reception by said aircraft of glide path radio signals, said apparatus comprising an automatic pilot for regulating the position of said aircraft relative to said glide path, said pilot being initially energized to direct said aircraft upwardly from said glide path, and means conditioned upon the reception of glide-path signals of predetermined amplitude for restoring said pilot to the normal on-course condition.

10. In an aircraft instrument-landing system, apparatus for producing a fly-up signal in the event of failure of reception by said aircraft of glide path radio signals, said apparatus comprising an automatic pilot for regulating the position of said aircraft relative to said glide path, said pilot being initially energized to direct said aircraft upwardly from said glide path, and means conditioned upon the reception of glide-path signals for restoring said pilot to the normal on-course condition, said apparatus including means responsive to displacement of said aircraft from said glide path and operative on said pilot to apply a corrective motion to said aircraft.

11. In an aircraft instrument landing system having overlapping lobes of mutually distinctive audio-modulated radio beams the equi-signal axis of which defined a glide path for said aircraft, the combination comprising a landing instrument indicating the relation of said aircraft to said glide path, said instrument initially being biased from the neutral or on-course position to provide a fly-up signal, and means derived from the detected audio component of said beams for neutralizing said instrument bias.

12. The combination as claimed in claim 11 wherein said last named means includes band-pass filters for the audio components of said beams, and a rectifier excited by the audio signals across said filters for producing a corrective signal for said instrument.

13. A method of indicating the position of an aircraft relative to overlapping radio beams defining a glide path, comprising initially providing a fly-up signal, neutralizing said signal in response to reception of energy from said beams, and modifying said signal according to the displacement of said aircraft from said glide path.

14. Apparatus for indicating the position of an aircraft relative to an equi-signal line defining a glide path formed by overlapping radio beams, comprising electric power lines in said aircraft, a glide-path meter responsive to the energy in said power lines to provide a fly-up signal, a receiver for receiving energy from said beams, means conditioned on the reception of said energy for neutralizing said fly-up signal, and means responsive to displacement of said aircraft from said path for operating said meter.

15. In an aircraft receiver for an instrument landing system having a glide path defined by the equi-signal zone of distinctively audio-modulated intersecting directive radiation patterns, filter means for selectively attenuating noise and frequencies other than the audio modulation frequencies, a pitch indicater, means biasing the same to a fly-up indication and means responsive to the signals passed by said filter for neutralizing said biasing means.

16. In an equi-signal radio guidance system, apparatus responsive to off-course signals, means initially providing an off-course signal, and means sensitive to radio guidance signals above a predetermined minimum strength for disabling the effectiveness of said initial off-source signal.

17. In a radio system adapted to guide a craft along an equi-signal course, apparatus responsive to off-course signals, means initially providing an off-course signal to said apparatus, means sensitive to radio guidance signals above a predetermined minimum strength for disabling the effectiveness of said initial off-course signal, and means for supplying signals to said apparatus varying in magnitude with the angular displacement of said craft from said course.

18. An equi-signal radio craft guidance indicator, comprising indicating means normally biased to provide an initial off-course signal, and compensating means responsive to variable magnitude radio signals exceeding in field strength a predetermined minimum for producing a signal balancing said initial off-course signal.

19. In a radio system adapted to automatically guide a craft along an equi-signal course, apparatus mountable on said craft comprising an automatic pilot having means normally responsive to radio guidance signals for regulating the attitude of said craft relative to said course, means for initially energizing said pilot to direct said craft away from said course, and means conditioned upon the reception of radio guidance signals above a predetermined amplitude for restoring the normal responsiveness of said pilot to said radio signals.

20. In an indicating device responsive to a duplex signal that causes a meter to read zero when the two components of said duplex signal are in balance, means for causing said meter to read off scale in the absence of said signal and being ineffective upon said meter in the presence of said signal, said means comprising rectifying means and an electron discharge tube having a grid controlled by a voltage developed by said rectifying means from said signal.

21. The method of indicating the position of an aircraft with respect to a pair of directional radio beams comprising receiving said beams in said aircraft, deriving audio frequency signals from each beam, deriving a rectified direct current from each audio frequency component, applying the current in opposition to an indicating meter, providing current from an auxiliary source dependent upon said beams for permitting the meter the read off scale in an "up" direction in the absence of a signal in the receiver, and removing such current in the presence of such a signal.

22. In a receiver for an aircraft glide path indicating system, said receiver responsive to a duplex composite signal and having an indicating meter actuated by voltage derived from a pair of bridge type rectifiers connected in series opposition, a pair of filter circuits for the selection of one of the duplex signal components for each of said rectifiers, said filter circuits having output terminals insulated from the input terminals of said filters, means for causing said meter to read off scale in the absence of said signal, said means ineffective upon said meter in the presence of said signal, said means comprising an electron emitting tube having a grid, a cathode and an anode with a conductive circuit betwen the anode and cathode, said circuit including said indicating meter.

23. In a receiver for an aircraft glide path indicating system, said receiver responsive to a duplex composite signal and having an indicating meter actuated by voltage derived from a pair of bridge type rectifiers connected in series opposition, a pair of filter circuits for the selection of one of the duplex signal components for each of said rectifiers, said filter circuits having output terminals insulated from the input terminals of said filters, means for causing said meter to read off scale in the absence of said signal, said means ineffective upon said meter in the presence of said signal, said means comprising an electron emitting tube having a grid, a cathode and an anode with a conductive circuit between the anode and cathode, said circuit including said indicating meter, a rectifier having an anode and cathode, said rectifier arranged to produce a D. C. potential between its anode and cathode proportional to the signal impressed on said rectifier and a conductive connection between said grid and the anode of said rectifier.

24. In a glide path receiver of the type wherein balanced signal voltages are derived from a pair of directional radio beams, said receiver having an indicating meter, means effective for causing said meter to read off scale in the absence of a signal and being inoperative to effect said meter in the presence of a signal, said means comprising a grid controlled electron discharge tube having said meter in its anode circuit, a rectifier, a resistor between the anode and cathode of the rectifier for developing a D. C. voltage proportional to the signal impressed on said rectifier and a conductive connection between the anode of said rectifier and the grid of said discharge tube.

25. In a radio system adapted to automatically guide a craft along an equi-signal path, apparatus mountable on said craft comprising an automatic pilot having means normally responsive to radio glide path signals for regulating the attitude of said craft relative to said path, means for initially energizing said pilot to cause said craft to fly up, and means conditioned upon the reception of radio guidance signals above a predetermined amplitude for restoring the normal responsiveness of said pilot to said radio signals.

26. In a radio system adapted to automatically guide a craft along a radio glide path, apparatus mountable on said craft comprising an automatic pilot, means responsive to radio glide path signals for regulating the flight path of said craft in elevation through said automatic pilot, means for normally biasing said radio means to cause said pilot to cause said craft to climb, and means conditioned upon the reception of said radio signals above a predetermined minimum amplitude for restoring the normal responsiveness of said radio means to said radio signals.

WAYNE G. ABRAHAM.

REFERENCES CITED

The following references are of record in the file of this patent:

UNITED STATES PATENTS

| Number | Name | Date |
| --- | --- | --- |
| 1,827,590 | Kline | Oct. 13, 1931 |
| 2,006,918 | Hahnemann | July 2, 1935 |

Certificate of Correction

Patent No. 2,489,248                                November 29, 1949

WAYNE G. ABRAHAM

It is hereby certified that errors appear in the printed specification of the above numbered patent requiring correction as follows:

Column 3, line 50, for "600 to 900" read *600 and 900*; column 9, line 55, for "off-source" read *off-course*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*